United States Patent
Youn et al.

(10) Patent No.: US 10,423,326 B2
(45) Date of Patent: Sep. 24, 2019

(54) VEHICLE AND CONTROL METHOD OF THE SAME

(71) Applicants: Hyundai Motor Company, Seoul (KR); Kia Motors Corporation, Seoul (KR)

(72) Inventors: Seok-young Youn, Seoul (KR); HeeJin Ro, Seoul (KR); Gi Beom Hong, Bucheon-si (KR); Kye Yoon Kim, Gunpo-si (KR); Gideok Kwon, Seoul (KR); Jong Bok Lee, Suwon-si (KR); Donghee Seok, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/826,336

(22) Filed: Nov. 29, 2017

(65) Prior Publication Data

US 2019/0114066 A1    Apr. 18, 2019

(30) Foreign Application Priority Data

Oct. 13, 2017 (KR) .................. 10-2017-0133091

(51) Int. Cl.
| | | |
|---|---|---|
| G06F 3/041 | (2006.01) | |
| G06F 3/0488 | (2013.01) | |
| G06F 3/0481 | (2013.01) | |
| B60K 35/00 | (2006.01) | |
| G06F 3/0482 | (2013.01) | |

(52) U.S. Cl.
CPC .......... *G06F 3/04883* (2013.01); *B60K 35/00* (2013.01); *G06F 3/0482* (2013.01); *G06F 3/04817* (2013.01); *B60K 2370/143* (2019.05)

(58) Field of Classification Search
None
See application file for complete search history.

(56) References Cited

U.S. PATENT DOCUMENTS

| | | | | |
|---|---|---|---|---|
| 2015/0145805 A1* | 5/2015 | Liu | ........................... | G06F 3/01 345/174 |
| 2016/0110093 A1* | 4/2016 | S | ........................ | G06F 3/04883 715/863 |
| 2017/0357413 A1* | 12/2017 | Green | ................. | G06F 3/04883 |
| 2018/0191517 A1* | 7/2018 | Emigh | ................ | G06F 3/03547 |

* cited by examiner

*Primary Examiner* — Joseph R Haley
(74) *Attorney, Agent, or Firm* — Morgan, Lewis & Bockius LLP

(57) ABSTRACT

A vehicle configured to receive a command of a user and a control method for the same may include a manipulator having a metal bar extending in a first direction and formed of a metal material, and a plurality of detectors disposed adjacent to the metal bar in the first direction, a display configured to display a manipulation result of the manipulator, and a controller configured to generate a control signal for controlling an operation of the display based on an output signal of the manipulator, wherein, when a drag touch is input to the manipulator in the first direction, the display displays a function execution screen for a function mapped to the manipulator.

17 Claims, 16 Drawing Sheets

VEHICLE AND CONTROL METHOD OF THE SAME

CROSS-REFERENCE TO RELATED APPLICATION

The present application claims priority to Korean Patent Application No. 10-2017-0133091, filed on Oct. 13, 2017 in the Korean Intellectual Property Office, the entire contents of which is incorporated herein for all purposes by this reference.

BACKGROUND OF THE INVENTION

Field of the Invention

The present invention relates to a vehicle configured to receive a command of a user, and a control method of the same.

Description of Related Art

A vehicle may perform additional functions for convenience of a user, such as an audio function, a video function, a navigation function, control of air conditioning, control of a seat, and control of lighting, in addition to a basic driving function.

To perform the above functions, the vehicle includes a display configured to display a menu screen or a control screen and receives a selection of a desired menu by a user or receives a control command for a selected menu according to a hard key scheme, a touch screen scheme, or a gesture recognition scheme.

However, when the hard key scheme is used, a physically wide space is required to provide a plurality of hard keys, or a manipulation load of a user for inputting control commands with a small number of hard keys is increased.

Furthermore, when the touch screen scheme is used, a user needs to directly touch a display provided in a dashboard to input a control command, and thus it may be very difficult to safely drive a vehicle. Meanwhile, there is a risk of malfunction in the gesture recognition scheme.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle including a manipulator configured for being conveniently manipulated by a user.

Additional aspects of the disclosure will be set forth in portion in the description which follows and, in part, will be obvious from the description, or may be learned by practice of the disclosure.

In accordance with one aspect of the present invention, a vehicle may include a manipulator including a metal bar extending in a first direction and formed of a metal material, and a plurality of detectors disposed adjacent to the metal bar in the first direction, a display configured to display a manipulation result of the manipulator, and a controller configured to generate a control signal for controlling an operation of the display based on an output signal of the manipulator, wherein, when a drag touch is input to the manipulator in the first direction, a function execution screen is displayed for a function mapped to the manipulator.

When a drag touch is input to the manipulator in a second direction opposite to the first direction, the display may terminate the function execution screen for the function mapped to the manipulator.

The manipulator may include a plurality of manipulators including a first manipulator and a second manipulator.

Different functions may be mapped to the first and second manipulators.

The display may display a result screen for a function mapped to the first manipulator when the drag touch is input to the first manipulator; and the display may display a result screen for a function mapped to the second manipulator when the drag touch is input to the second manipulator.

When a predetermined first touch is input to the manipulator, the display may display a preview screen for the function mapped to the manipulator.

The preview screen may be provided in an area of the display screen.

The manipulator may include a plurality of manipulators including a first manipulator and a second manipulator; and the display may display a preview screen for a function mapped to the first manipulator when the first touch is input to the first manipulator, and display a preview screen for a function mapped to the second manipulator when the first touch is input to the second manipulator.

When a predetermined touch is input to the second manipulator while the display displays the preview screen for the function mapped to the first manipulator, the display may switch the preview screen for the function mapped to the first manipulator to the preview screen for the function mapped to the second manipulator.

When a predetermined second touch is input to the manipulator while the function execution screen is provided to the display, the display may display a home menu screen including a plurality of buttons in an area of the display screen.

The display may display the home menu screen in which the plurality of buttons are disposed on the basis of an alignment direction of the metal bar.

When a drag touch is input to the manipulator along the metal bar, the display may provide a button icon selected by the drag touch from among the plurality of buttons provided on the home menu screen by changing a state of the button icon.

The manipulator may include a first detector device including the metal bar and a first detector connected to the metal bar and configured to collect touch information related to a user regarding the metal bar; and a second detector device including a plurality of second detectors disposed adjacent to one side of the metal bar in the first direction and configured to collect touch or proximity information related to the user regarding the plurality of second sensors. When detector value information related to the first detector device is collected, the controller may recognize a touch of the user based on detector value information collected by the second detector device together with the detector value information related to the first sensor device.

The manipulator may further include a third detector device including a plurality of third detectors disposed adjacent to the other side of the metal bar in the first direction and configured to collect touch or proximity information related to the user regarding the plurality of third sensors, wherein, when the detector value information related to the first detector is received, the controller may recognize the touch of the user based on detector value information collected by at least one of the second detector device and the third detector device together with the detector value information related to the first sensor device.

In accordance with another aspect of the present invention, a method for controlling a vehicle including a manipulator having a metal bar extending in a first direction and formed of a metal material and a plurality of detectors disposed adjacent to the metal bar in the first direction, and a display configured to display a manipulation result of the manipulator, the method including inputting a drag touch to the manipulator in the first direction; generating a control signal for controlling an operation of the display based on an output signal of the manipulator; and displaying, by the display, a function execution screen for a function mapped to the manipulator.

The method may further include terminating, by the display, the function execution screen for the function mapped to the manipulator when a drag touch is input to the manipulator in a second direction opposite to the first direction thereof.

The method may further include displaying, by the display, a preview screen for the function mapped to the manipulator in an area of the display screen when a predetermined first touch is input to the manipulator.

The method may further include displaying, by the display, a home menu screen including a plurality of buttons in an area of the display screen when a predetermined second touch is input to the manipulator while the function execution screen is provided to the display.

The displaying of the home menu screen may include displaying a home menu screen in which the plurality of buttons are disposed on the basis of an alignment direction of the metal bar; and providing a button icon selected by a drag touch from among the plurality of buttons displayed on the home menu screen by changing a state of the button icon when the drag touch is input to the manipulator in the first direction.

The manipulator may include a first detector device including the metal bar and a first detector connected to the metal bar to collect touch information related to a user regarding the metal bar; a second detector device including a plurality of second detectors disposed adjacent to one side of the metal bar in the first direction and configured to collect touch or proximity information related to the user regarding the plurality of second sensors; and a third detector including a plurality of third detectors disposed adjacent to the other side of the metal bar in the first direction and configured to collect touch or proximity information related to the user regarding the plurality of third sensors, wherein, when detector value information related to the first detector device is received, a touch of the user may be recognized based on detector value information collected by at least one of the second detector device and the third detector device together with the detector value information related to the first sensor device.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
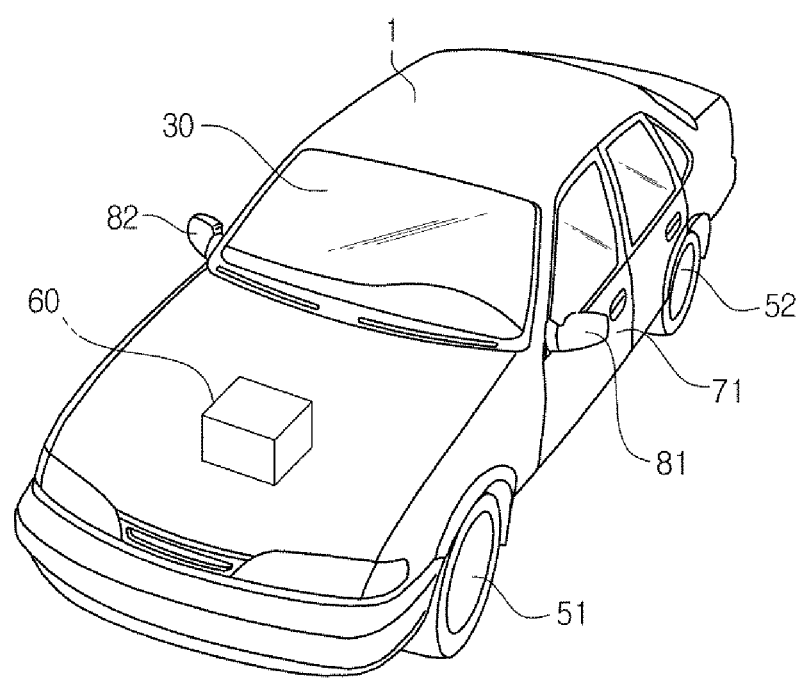
FIG. 1 is a view illustrating an external of a vehicle according to an exemplary embodiment.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be the determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The same reference numerals denote the same elements throughout the specification. All the elements of the exemplary embodiments are not described in the specification, and general content in a Field of the Invention to which the present invention pertains or duplicated content in the exemplary embodiments will be omitted.

Throughout the specification, when a part or a portion is described as being "connected" to another portion, the parts may be indirectly connected or directly connected to each other, and the indirect connection includes a connection through a wireless communication network.

Furthermore, when a part or a portion is described as including an element, the part or the portion may further include another element without excluding the other element unless a special contradictory description is given.

Throughout the specification, when a member is referred to as being located on another member, a third member may be present between the two members in addition to the two members being in contact.

Terms including "first" and "second," are used to distinguish one element from other elements, and the elements are not limited by the terms.

Terms in the singular form may include the plural forms unless otherwise specified.

Reference numerals of operations are used for convenience of description, and the reference numerals do not indicate the order of the operations. The operations may be performed in an order which is different from the described order unless a specific order is clearly described in context.

Hereinafter, an operation principle and embodiments of the present invention will be described with reference to the accompanying drawings.

FIG. 1 is a view illustrating an external of a vehicle 100 according to an exemplary embodiment.

Referring to FIG. 1, the vehicle 100 may include a main body 1 forming an external of the vehicle 100, a front glass 30 providing a driver with a field of vision in a forward direction of the vehicle 100, wheels 51 and 52 configured to move the vehicle 100, a driving device 60 configured to rotate the wheels 51 and 52, doors 71 configured to shield an internal of the vehicle 100 from the outside, and side mirrors 81 and 82 providing the driver with a field of vision in a rearward direction of the vehicle 100.

The front glass 30 is provided at a front upper side of the main body 1 so that a driver within the vehicle 100 can obtain visual information in front of the vehicle 100. The front glass 30 is also referred to as a windshield glass.

The wheels 51 and 52 include a front wheel 51 provided at a front side of the vehicle 100 and a rear wheel 52 provided at a rear side of the vehicle 100. The driving device 60 may provide a rotational force to the front wheel 51 or the rear wheel 52 to move the main body 1 in a front and rear direction thereof. The driving device 60 may include an engine configured to generate the rotational force by burning a fossil fuel or a motor configured to generate the rotational force by receiving power from an electric condenser.

The doors 71 are rotatably provided at right and left sides of the main body 1 so that the driver can enter the vehicle 100 when the doors 71 are open. When the doors 71 are closed, the internal to the vehicle 100 is shielded from the outside thereof by the doors 71. The doors 71 may be provided with windows 72 to allow an occupant to see the outside or to allow a person to see the internal to the vehicle 100 from the outside. In various exemplary embodiments, the windows 72 may be designed such that the outside or the internal to the vehicle may be viewed only from one side and may be provided to be opened and closed.

The side mirrors 81 and 82 include a left side mirror 81 provided at the left side of the body 1 and a right side mirror 82 provided at the right side of the body 1, and allow the driver within the vehicle 100 to acquire visual information from lateral sides and the rear side of the vehicle 100.

Figure 2:
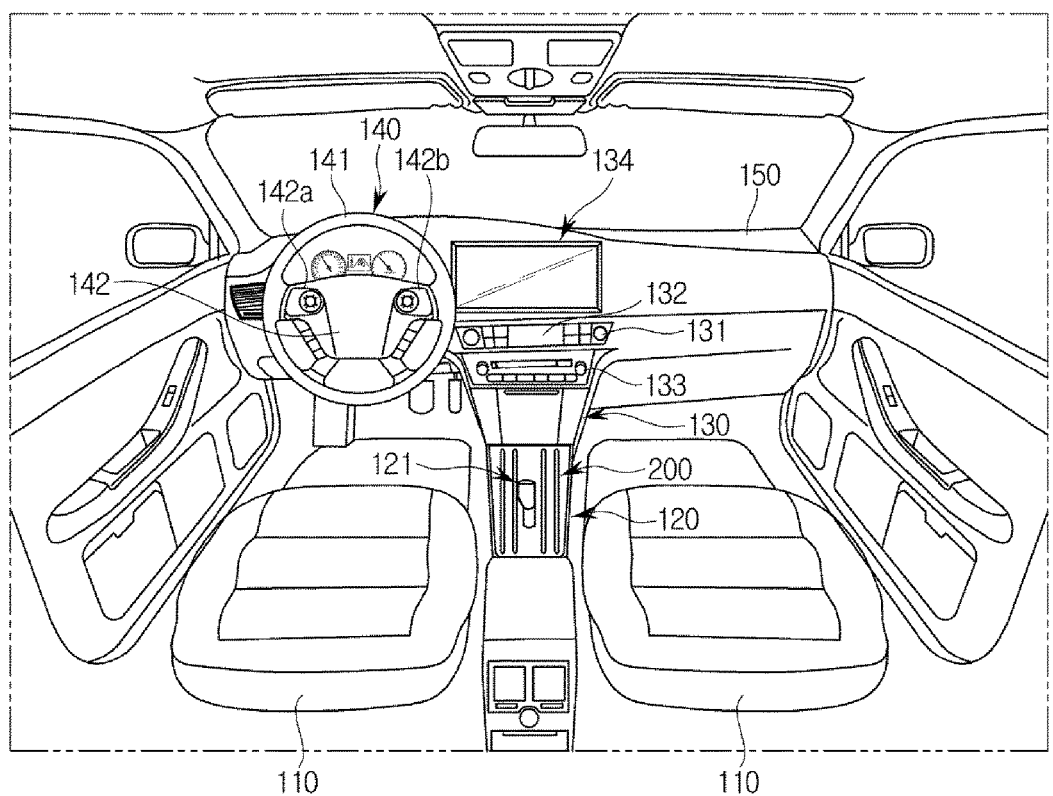
FIG. 2 is a view illustrating an internal of a vehicle according to an exemplary embodiment.

FIG. 2 is a view illustrating an internal configuration of the vehicle 100 according to an exemplary embodiment. Referring to FIG. 2, the vehicle 100 may include seats 110 on which the driver and the like are accommodated, a center console 120, a center fascia 130, and a dashboard 150 in which a steering wheel 140 and the like are provided.

A shift lever 121 configured to shift a gear of the vehicle 100 and a vehicle manipulator 200 configured to control performance of functions of the vehicle 100 may be disposed in the center console 120. The center console 120 refers to an area in which a console box configured to preserve the shift lever 121 and articles is formed between a driver's seat and a passenger seat. A configuration and an operation principle of the vehicle manipulator 200 disposed in the center console 120 will be described more specifically in a related portion of the present disclosure.

An air conditioning device 131, a clock 132, an audio device 133, an audio visual navigation (AVN) device 134, and the like may be disposed in the center fascia 130.

The air conditioning device 131 maintains comfort of the internal of the vehicle 100 by adjusting a temperature, humidity, cleanliness of air, and a flow of the air within the vehicle 100. The air conditioning device 131 is disposed in the center fascia 130 and may include at least one discharge port 131a configured to discharge air. Buttons or dials configured to control the air conditioning device 131 or the like may be disposed in the center fascia 130. A user including the driver, may control the air conditioning device 131 by use of the button disposed in the center fascia 130.

The clock 132 may be provided around the button or the dial configured to control the air conditioning device 131.

The audio device 133 includes a control panel provided with a plurality of buttons configured to perform functions of the audio device 133. The audio device 133 may provide a radio mode configured to provide a radio function and a media mode configured to reproduce an audio file from various storage media including audio files.

The AVN device 134 may be embedded inside the center fascia 130 of the vehicle 100. The AVN device 134 is a device that may collectively perform an audio function, a video function, and a navigation function according to a manipulation of the user. The AVN device 134 may include an inputter 135 configured to receive a user command for the AVN device 134, and a display 300 configured to display a screen related to the audio function, a screen related to the video function, or a screen related to the navigation function.

The steering wheel 140 is a device configured to adjust a travelling direction of the vehicle 100 and may include a rim 141 gripped by the driver and a spoke 142 connected to a steering device of the vehicle 100 and configured to connect the rim 141 and a hub of a rotation shaft for steering. In an exemplary embodiment of the present invention, manipulators 142a and 142b configured to control various devices in the vehicle including an audio device, may be formed in the spoke 142.

Furthermore, in an exemplary embodiment of the present invention, the dash board 150 may further include various gauges that may display a travelling speed of the vehicle 100, revolutions per minute (RPM) of the engine, a level of a fuel, and the like, and a globe box in which various articles may be accommodated.

Hereinafter, among the components of the vehicle, a vehicle manipulator will be described more specifically with reference to the accompanying drawings.

Figure 3:
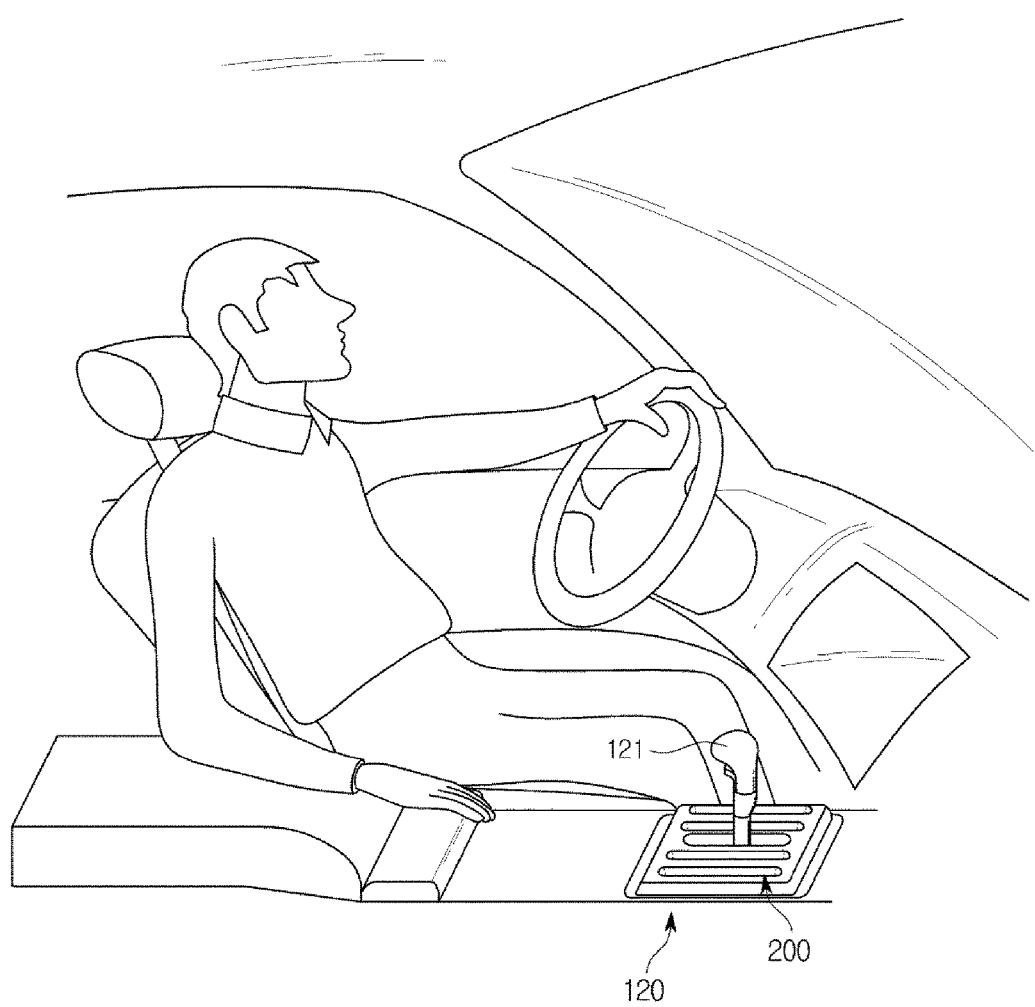
FIG. 3 is a view illustrating a state in which a user manipulates a vehicle manipulator when viewed from a passenger seat.

FIG. 3 is a view illustrating a state in which a user manipulates the vehicle manipulator 200 when viewed from a passenger seat.

Referring to FIG. 3, the vehicle manipulator 200 is provided in the center console 120 between the driver's seat and the passenger seat.

, to control the AVN device 134, the user manipulates a hard key provided around the display. Accordingly, a posture of the user driving the vehicle may be disturbed, which may poorly influence safe driving, and a large space may be consumed to provide a plurality of hard keys or the hard keys may have to be manipulated several times to input a desired control command.

However, according to an exemplary embodiment of the present invention, the user may manipulate various devices provided within the vehicle 100 more conveniently through the vehicle manipulator 200 provided in the center console 120. An example of displaying a display screen according to a manipulation of the vehicle manipulator 200 will be described below in a related portion of the present disclosure.

Figure 4:
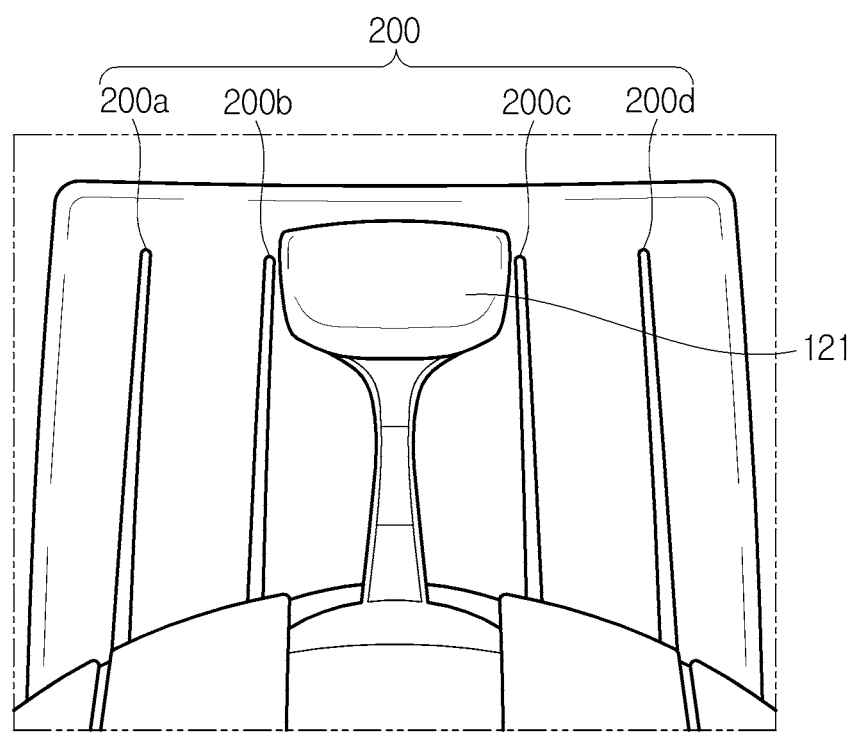
FIG. 4 is an enlarged view illustrating the vehicle manipulator according to the embodiment.
Figure 5:
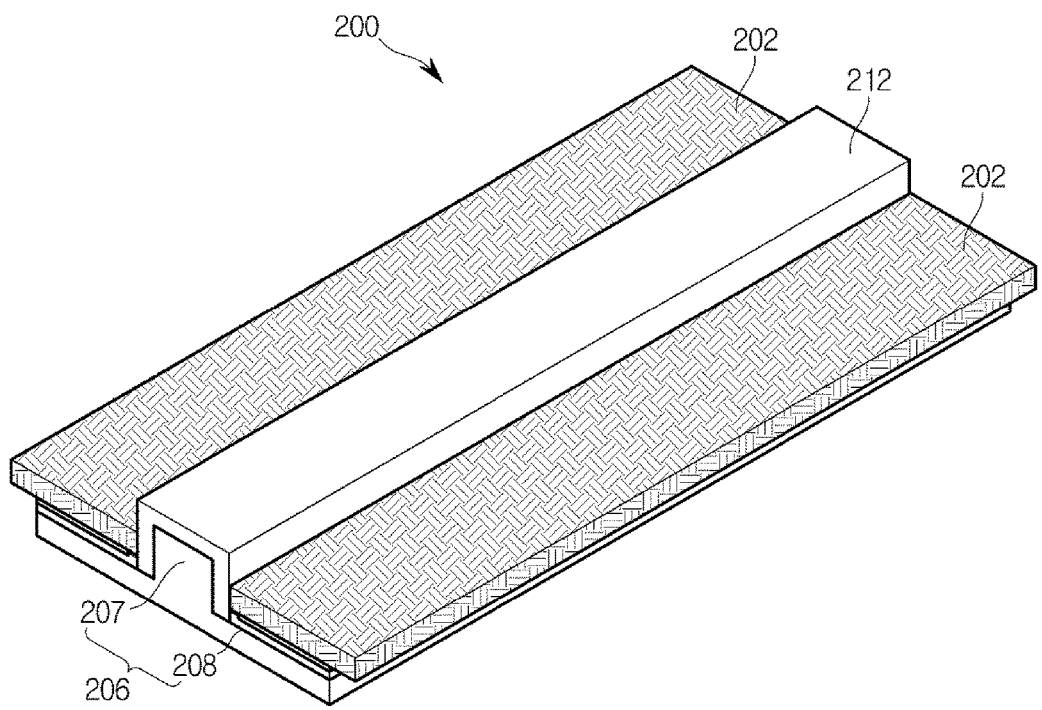
FIG. 5 is a perspective view of the vehicle manipulator according to the embodiment.

FIG. 4 is an enlarged view illustrating the vehicle manipulator 200 according to the embodiment. FIG. 5 is a perspective view of the vehicle manipulator 200 according to the embodiment.

Referring to FIG. 4, the vehicle manipulator 200 according to the embodiment may be disposed around the shift lever 121. The vehicle manipulator 200 may be provided such that four metal bars are buried under an upper surface of the center console 120, and more specifically, may include first to fourth manipulators 200*a*, 200*b*, 200*c*, and 200*d*. Although FIG. 4 illustrates an example in which the vehicle manipulator 200 is disposed around the shift lever 121 in a form of four metal bars, the number and installation locations of the metal bars that are disposed in the vehicle manipulator 200 are not limited to the example of FIG. 4.

In other words, the vehicle manipulator 200 may be disposed at any location at which the driver or the passenger of the vehicle may conveniently manipulate the vehicle manipulator 200, for example, around a button manipulator of the center fascia 130, around a seat, and on an internal side of the doors, and in an exemplary embodiment of the present invention, the vehicle manipulator 200 may be disposed at a rear surface of the driver's seat or the passenger seat for convenience of manipulation of the passengers in a back seat.

Hereinafter, an exemplary embodiment in which the vehicle manipulator 200 is disposed as illustrated in FIG. 4 will be exemplarily described for convenience of description.

Referring to FIG. 5, the vehicle manipulator 200 of the vehicle 100 according to an exemplary embodiment of the present invention may include a metal bar 212 and a detector cover 202.

The metal bar 212 may extend in a first direction thereof. The metal bar 212 may be formed of a metal material.

The metal bar 212 may be configured to be touched or slid using a portion of the body of the user including a finger. The metal bar 212 may be configured to protrude upwards from the detector cover 202. When the metal bar 212 protrudes upwards from the detector cover 202, the user may easily find and touch or slide the metal bar 212 in a dark environment.

The metal bar 212 may be configured to protrude about 0.6 mm from an upper surface of the detector cover 202. The present value is determined in consideration of a detecting area of a second detector 222 (see FIG. 6), which will be described below, and the value may be changed according to a design specification.

The metal bar 212 may be configured to cover a periphery of the metal bar 212. The detector cover 202 may be attached to a side surface of the metal bar 212 such that a gap may not be present between the detector cover 202 and the metal bar 212. Thus, a foreign substance may be prevented from being introduced between the detector cover 202 and the metal bar 212.

A detector may be disposed under the detector cover 202. The detector cover 202 may protect the detector from an external impact.

The detector cover 202 may be formed of various materials. For example, the detector cover 202 may be formed of at least one of wood, leather, and polycarbonate. The material of the detector cover 202 may be selected in consideration of functions thereof including an impact-resistant property. The material of the detector cover 202 may be selected in consideration of an internal design of the vehicle.

The vehicle manipulator 200 according to an exemplary embodiment of the present invention may be provided such that only a protruding portion of the metal bar 212 and the upper surface of the detector cover 202 may be exposed to the outside. Thus, the detector disposed under the detector cover 202 may be protected from an external impact. Furthermore, aesthetics in a design of the input device may be improved.

Figure 6:
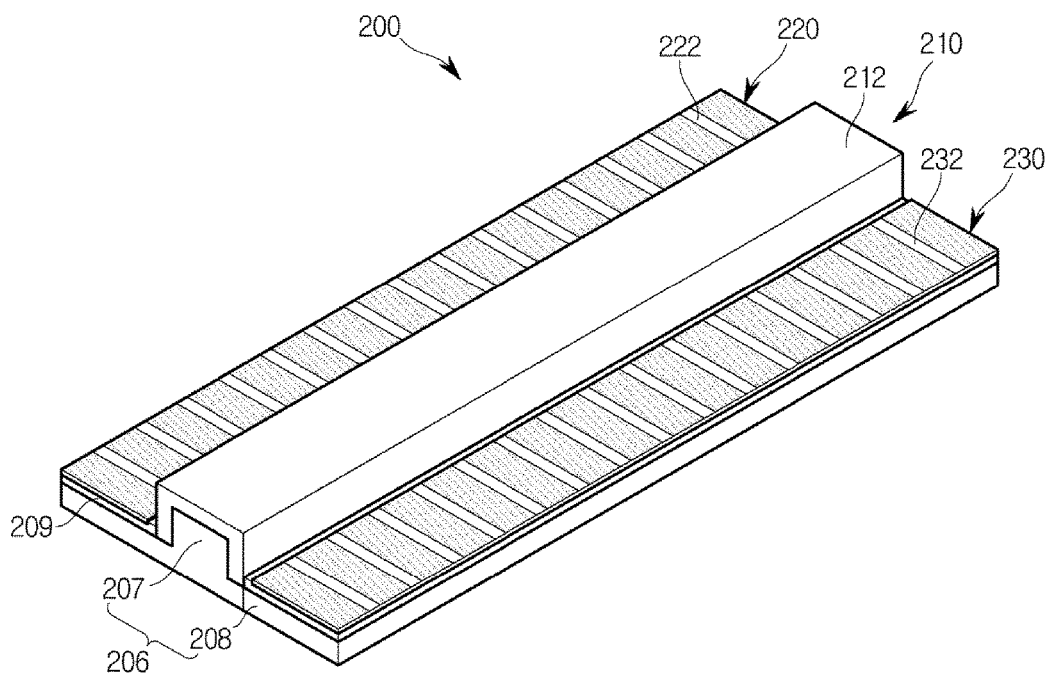
FIG. 6 is a perspective view of the vehicle manipulator according to the embodiment from which a detector cover is removed.
Figure 7:
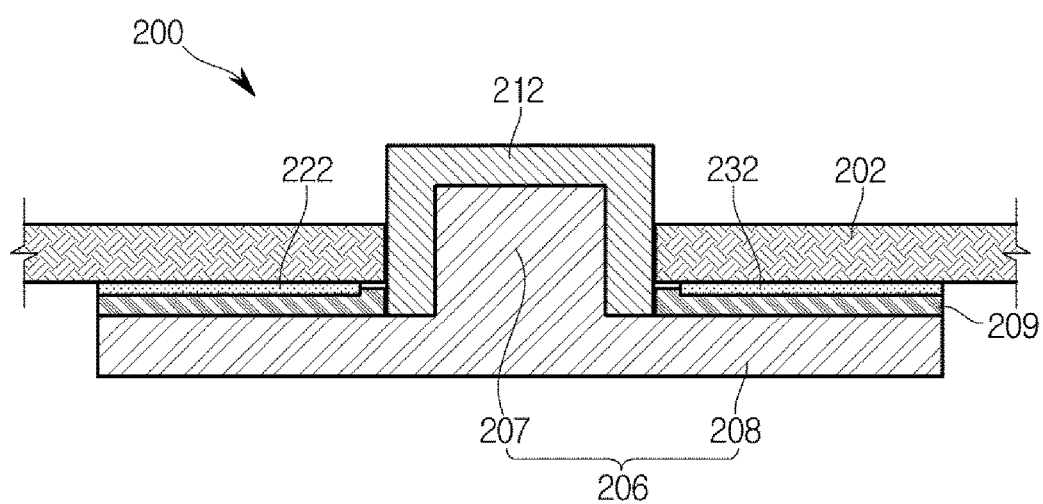
FIG. 7 is a sectional view of the vehicle manipulator according to the embodiment.

FIG. 6 is a perspective view of the vehicle manipulator 200 according to the embodiment from which the detector cover 202 is removed. FIG. 7 is a sectional view of the vehicle manipulator 200 according to the embodiment.

As illustrated in FIG. 6 and FIG. 7, the vehicle manipulator 200 may include a first detector device 210 including the metal bar 212, a second detector device 220 including a plurality of second sensors, a third detector device 230 including a plurality of third sensors, a nonconductive coating layer 209, and a metal bar guide 206. Furthermore, although not illustrated in the drawings, the first detector device 210 of the vehicle manipulator 200 may include a first detector connected to the metal bar 212 to detect a touch of the user on the metal bar 212.

The metal bar guide 206 may be formed of a nonconductive material. This is because a weight of the metal bar guide 206 and manufacturing costs of the metal bar guide 206 are increased when the metal bar guide 206 is formed of a metal material like the metal bar 212. However, the material of the metal bar guide 206 is not limited to the nonconductive material, and the metal bar guide 206 may be formed of a conductive material. Furthermore, the metal bar guide 206 and the metal bar 212 may be integrally formed.

The metal bar guide 206 may include a protrusion 207 extending in the first direction and protruding upward such that the metal bar 212 may be fitted onto the metal bar guide 206. The metal bar guide 206 may include bases 208 extending from opposite end portions of the protrusion 207 in a second direction perpendicular to the first direction thereof. In other words, the metal bar guide 206 may include the plate-shaped bases 208 and the protrusion 207 protruding upwards from the bases 208.

The metal bar 212 may be fitted onto the protrusion. The metal bar 212 may be connected to the first sensor. The first detector or may detect a touch of the user on the metal bar 212. Because the metal bar 212 is formed of a conductive metal material, the first detector or may collect touch information even when the user touches any portion of the metal bar 212.

A nonconductive coating layer 209 may be disposed on an upper surface of the base 208. The nonconductive coating layer 209 may be formed of a nonconductive material. The nonconductive coating layer 209 may be provided to cover the entire upper surface of the base 208. However, the present invention is not limited thereto, and the nonconductive coating layer 209 may be provided to cover a portion of the upper surface of the base 208.

The second detector device 220 may be disposed to the left of the metal bar 212 with respect to the metal bar 212, and the third detector device 230 may be disposed to the right of the metal bar 212.

The second detector device 220 may include a plurality of second detectors 222, and the plurality of second detectors 222 may be disposed to be spaced a predetermined distance from each other in the first direction. The plurality of second detectors 222 may be disposed on an upper surface of the nonconductive coating layer 209 to be electrically separated from each other by the nonconductive coating layer 209, and accordingly, the plurality of second detectors 222 may be prevented from coming into contact with each other and being electrically connected to each other.

Furthermore, the plurality of second detectors 222 may be disposed adjacent to the metal bar 212. More specifically, the plurality of second detectors 222 may be spaced a predetermined interval from the metal bar 212 in the second direction thereof. Because the plurality of second detectors 222 are disposed adjacent to the metal bar 212, a distance between the metal bar 212 and the second detectors 222 may be very small. Thus, the metal bar 212 and the second detectors 222 may be prevented from coming into contact with each other and being electrically connected to each other.

The third detector device 230 may include a plurality of third detectors 232, and the plurality of third detectors 232 may be disposed to be spaced a predetermined distance from each other in the first direction thereof. The plurality of third detectors 232 may be disposed on the upper surface of the nonconductive coating layer 209 to be electrically separated from each other by the nonconductive coating layer 209, and accordingly, the plurality of third detectors 232 may be prevented from coming into contact with each other and being electrically connected to each other.

Furthermore, the plurality of third detectors 232 may be disposed adjacent to the metal bar 212. More specifically, the plurality of third detectors 232 may be disposed adjacent to the metal bar 212. More specifically, the plurality of third detectors 232 may be spaced a predetermined distance from the metal bar 212 in the second direction thereof. Because the plurality of third detectors 232 are disposed adjacent to the metal bar 212, a distance between the metal bar 212 and the third detectors 232 may be very small. Thus, the metal bar 212 and the third detectors 232 may be prevented from coming into contact with each other and being electrically connected to each other.

Although FIG. 6 and FIG. 7 illustrate an example in which the plurality of second detectors 222 are connected by one detector channel to form the second detector device 220 and the plurality of third detectors 232 are connected by one detector channel to form the third detector device 230, a design of a channel structure may be changed in various manners in an exemplary embodiment.

As an example, the second detectors 222 of the second detector device 220 and the third detectors 232 of the third detector device 230 may have a structure in which the second detectors 222 and the third detectors 232 disposed in the second direction perpendicular to the first direction with respect to the metal bar 212 are connected by one detector channel.

The numbers of the plurality of second detectors of the second detector device 220 and the plurality of third detectors 232 of the third detector device 230 may be variously designed according to an intention of a designer. For example, the second detector device 220 and the third detector device 230 may each include 10 to 15 sensors. Furthermore, the number of the second detectors 222 and the number of the third detectors 232 may be the same or different in an exemplary embodiment. When the numbers of the second detectors 222 and the third detectors 232 are the same, the second detectors 222 and the third detectors 232 may be disposed at opposite symmetrical locations at both side of the metal bar 212, and, in an exemplary embodiment of the present invention, may be disposed in a zig-zag.

The input device according to an exemplary embodiment of the present invention may detect an operation including a touch or a drag touch of the user on the input device by disposing the second detector device 220 and the third detector device 230 on opposite sides of the metal bar 212 such that the second detector device 220 and the third detector device 230 are symmetrical to each other.

The detector cover 202 may be disposed on the second detector device 220 and the third detector device 230. As described above, the detector cover 202 may protect the plurality of second detectors 222, the plurality of third detectors 232, and the nonconductive coating layer 209 disposed under the detector cover 202 from an external impact. The detector cover 202 may be attached to the metal bar 212 to prevent a foreign substance from being introduced between the detector cover 202 and the metal bar 212. The detector cover 202 may be attached to the metal bar 212 such that components except for the metal bar 212 are not exposed to the outside.

The configurations of the vehicle manipulator 200 have been described above. The technical spirit of the present invention is not limited to the above-described embodiments, and the design of the present invention may be modified in various manners in an exemplary embodiment. As an example, it is apparent that the metal bar 212 and the metal bar guide 206 of the vehicle manipulator 200 may be integrally formed, and the vehicle manipulator 200 may include the first detector device 210 and the second detector device 220 or include the first detector device 210 and the third detector device 230 in an exemplary embodiment.

Next, a manipulation method of the vehicle manipulator 200 and an operation principle of the vehicle will be described more specifically with reference to the above-described configurations of the vehicle manipulator 200.

Figure 8:
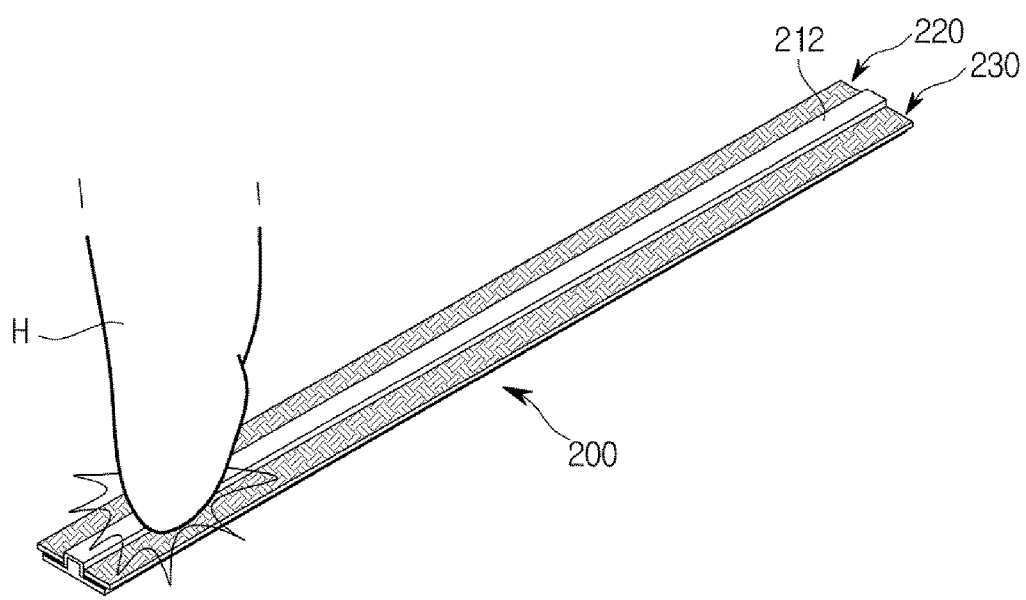
FIG. 8 is a view illustrating a touch input scheme of a user for the vehicle manipulator.
Figure 9:
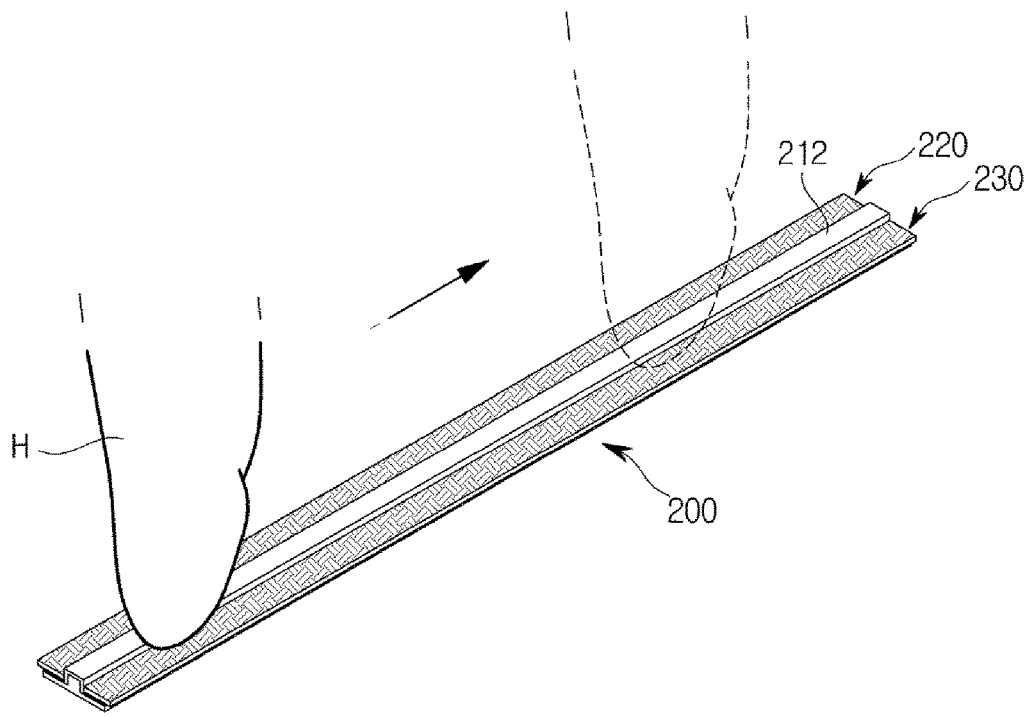
FIG. 9 is a view illustrating a drag touch input scheme of a user for the vehicle manipulator.

First, the manipulation method of the vehicle manipulator 200 will be described with reference to the accompanying drawings. FIG. 8 is a view illustrating a touch input scheme of a user for the vehicle manipulator 200. FIG. 9 is a view illustrating a drag touch input scheme of a user for the vehicle manipulator 200.

First, a touch input refers to a touch input of a user which is input in a manner in which one of body parts of the user comes into contact with the input device, and may refer to a user gesture which is input in a manner in which a finger of the user comes into contact with the vehicle manipulator 200.

Referring to FIG. 8, the touch input may be made through a finger H of the user. The user may touch the metal bar 212 of the vehicle manipulator 200 with any one of user's five fingers.

The finger H of the user has an average diameter ranging from 8 to 10 mm. Accordingly, when the metal bar 212 is touched by the finger H, the area of the finger H except for a thickness portion of the metal bar 212 may come into contact with at least one detection area of the second detector device 220 and the third detector device 230.

As an example, because an area in which the finger H of the user touches the metal bar 212 is wider than a width of the metal bar 212 when the user touches the metal bar 212 with the finger H, an area of the finger H necessarily come into contact with at least one of the second detector device 220 and the third detector device 230. The finger H of the user may come into contact with both the second detector device 220 and the third detector device 230 including the area of the metal bar 212, and in an exemplary embodiment of the present invention, may be come into contact with only one or more of the second detector device 220 and the third detector device 230.

Next, a drag touch input refers to an input of the user that slides in one direction in a state in which one of the body parts of the user comes into contact with the vehicle manipulator 200, and may refers to a user gesture that slides in a state in which the finger H of the user touches the metal bar 212 of the vehicle manipulator 200.

Referring to FIG. 9, the drag touch input may be made through the finger H of the user. The user may input the drag input along the metal bar 212 of the vehicle manipulator 200 with any one finger H of his or her five fingers.

Similar to the case in which the touch gesture of the user is input, when the drag input of the user is input, the area of the finger H except for the thickness portion of the metal bar 212 may come into contact with at least one detection area of the second detector device 220 and the third detector device 230. Hereinafter, a repeated description of content described when describing the touch input will be omitted.

Next, an example of providing a display screen according to a manipulation of the vehicle manipulator 200 will be described more specifically with reference to the accompanying drawings under the assumption that the vehicle 100 includes the above-described vehicle manipulator 200.

Figure 10:
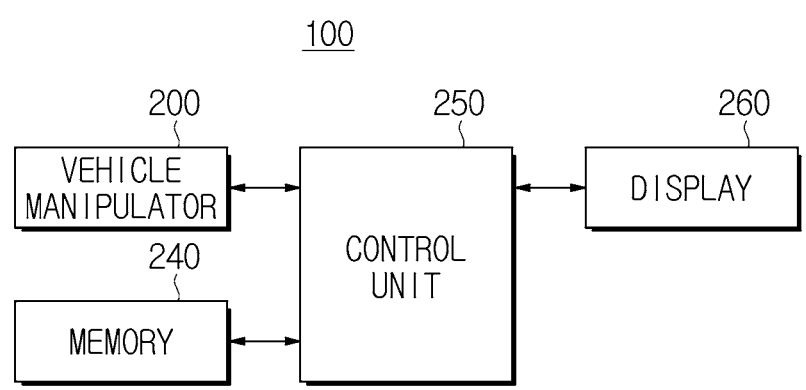
FIG. 10 is a control diagram illustrating the vehicle according to the embodiment.

FIG. 10 is a control diagram illustrating the vehicle 100 according to the embodiment.

Referring to FIG. 10, the vehicle 100 according to the embodiment includes the vehicle manipulator 200, a memory 240, a controller 250, and a display 260.

The vehicle manipulator 200 is configured to receive a control command for controlling the vehicle from a user. The vehicle manipulator 200 may be provided in a form of a plurality of bars, and hereinafter, an example in which the vehicle manipulator 200 includes the first to fourth manipulators 200a, 200b, 200c, and 200d will be described.

Figure 11:
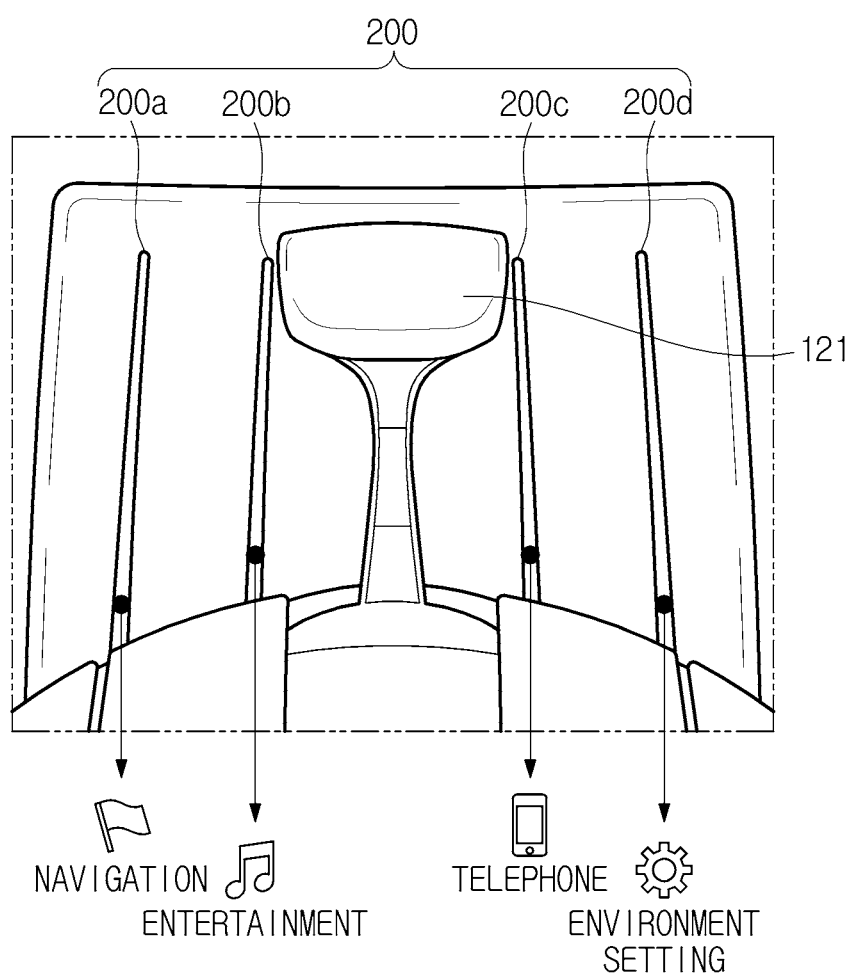
FIG. 11 is a view for describing functions mapped to the vehicle manipulator.

Different functions may be mapped to the first to fourth manipulators 200a, 200b, 200c, and 200d according to an intention of a designer. FIG. 11 is a view for describing functions mapped to the vehicle manipulator 200. Referring to FIG. 11, a navigation function may be mapped to the first manipulator 200a, an entertainment function may be mapped to the second manipulator 200b, a telephone function may be mapped to the third manipulator 200c, and an environment setting function may be mapped to the fourth manipulator 200d. An order and kinds of functions mapped to the vehicle manipulator 200 may be differently designed according to the intention of the designer.

Each of the first to fourth manipulators 200a, 200b, 200c, and 200d includes the first to third detector devices 210, 220, and 230. The operation principles of the first to third detector devices 210, 220, and 230 included in the first to fourth manipulators 200a, 200b, 200c, and 200d are the same, and examples, i.e., the first to third detector devices 210, 220, and 230, forming the first manipulator 200a will be described for convenience of description.

The first detector device 210 may include the metal bar 212 and a first detector, and the metal bar 212 and the first detector may be electrically connected. The first detector device 210 may be operated in a touch mode to collect touch information related to the user.

The second detector device 220 and the third detector device 230 are disposed at opposite end portions of the metal bar 212 of the first detector device 210. The second detectors 222 of the second detector device 220 or the third detectors 232 of the third detector device 230 may be operated in the touch mode or a hover mode. When a thickness of the detector cover 202 that protects the second detector device 220 is great, the second detector 222 may be operated in the hover mode.

Because the vehicle manipulator 200 according to an exemplary embodiment of the present invention is configured such that the second detector device 220 and the third detector device 230 may be operated in the hover mode, a touch gesture of the user may be recognized even when the finger H of the user does not directly touch the second detector 222.

The memory 240 may be configured to store various pieces of data, programs or applications for controlling the vehicle under the control of the controller 250. In more detail, the memory 240 may be configured to store a control program for controlling the vehicle, a dedicated application initially provided by a manufacturer or a general-purpose application downloaded from the outside, an object (for example, an image, text, an icon, or a button) for providing an application, and a database.

The memory 240 may perform a function configured for temporarily storing detector value information collected from the first detector to third detector device 210 to 230. Furthermore, the memory 240 may be configured to store data including location value information on the plurality of second detectors 222 and detector value information output when a control command of the user is input, which are necessary for recognizing an input of the user from the detector value information collected from the first to third detector devices 210 to 230.

The memory 240 may be configured to store information on an image, text, an icon, and a button for providing a control result screen to the display 260 based on a kind of control signal that may be generated by a manipulator and a control signal generated by the manipulator.

The memory 240 may include at least one storage medium of a flash memory, a hard disk, a memory card, a read-only memory (ROM), a random access memory (RAM), a memory card, an electrically erasable programmable read-only memory (EEPROM), a programmable read-only memory (PROM), a magnetic memory, a magnetic disk, and an optical disk.

The controller 250 controls overall operation of the vehicle and signal flows of the internal elements, and processes data. The controller 250 may execute an operation system (OS) and various applications stored in the memory 240 when a control command of the user is input to the vehicle manipulator 200 or a predetermined condition is satisfied.

The controller 250 may include a ROM in which a control program for controlling the vehicle is stored, and a RAM in which detector values or data delivered from various detectors disposed in the vehicle or which is used as a storage area corresponding to various operations, and the ROM and the RAM of the processor may be connected through an internal bus.

The controller 250 generates a control signal for controlling an operation of the display 260 based on an output signal of the vehicle manipulator 200.

The controller 250 may control the display 260 to display a result screen for the function mapped to the first manipulator 200a when a drag touch is input through the first manipulator 200a, and may control the display 260 to display a result screen for the function mapped to the second manipulator 200b when a drag touch of the user is input through the second manipulator 200b. In the specification, the result screen refers to a screen provided to the display after the control command is input through the vehicle manipulator 200, and may be a concept including a function execution screen provided when a specific function is executed and a screen (for example, a home screen) provided when a corresponding function is completed.

Hereinafter, control methods of the second to fourth manipulators 200b, 200c, and 200d are the same, and an exemplary embodiment of a manipulation method of the first manipulator 200a will be exemplarily described for convenience of description.

When a drag touch is input to the first manipulator 200a in the first direction, the controller 250 may generate a control signal for controlling an operation of the display 260 based on an output signal of the first manipulator 200a, and the display 260 may display a function execution screen for the function mapped to the first manipulator 200a.

When a drag touch is input to the first manipulator 200a in the second direction opposite to the first direction, the controller 250 may generate a control signal for controlling an operation of the display 260 based on the output signal of the first manipulator 200a, and the display 260 may terminate the function execution screen for the function mapped to the first manipulator 200a.

The present invention illustrates an example in which the metal bar 212 of the first manipulator 200a is disposed in a longitudinal direction of the vehicle, and in the instant case, the drag touch in the first direction may refer to a slide up gesture and the drag touch in the second direction may refer to a slide down gesture. Meanwhile, the first direction and the second direction are not limited to specific directions. In other words, the first direction and the second direction may be set to leftward and rightward directions instead of the upward and downward directions according to an installation direction of the metal bar 212, and accordingly, it is apparent that the method for providing a screen to the display 260 may vary.

Figure 12:
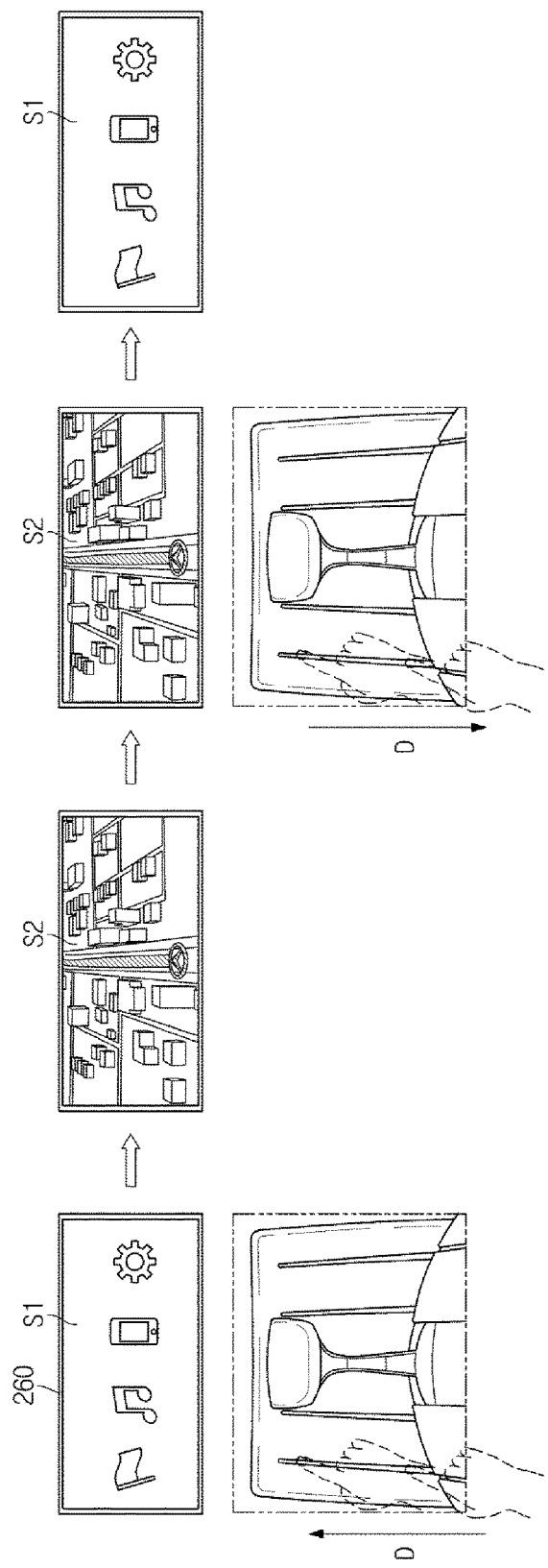
FIG. 12 is a view illustrating an example of a screen displayed on a display according to a drag touch input for the vehicle manipulator.

FIG. 12 is a view illustrating an example of a screen displayed on the display 260 according to a drag touch input for the vehicle manipulator 200.

As illustrated in FIG. 12, when a drag touch is input to the first manipulator 200a in the first direction, a home screen S1 provided to the display 260 may be switched to a function execution screen S2 for the navigation function mapped to the first manipulator 200a.

Subsequently, when a drag touch is input to the first manipulator 200a in the second direction, the function execution screen S2 for the navigation function provided to the display 260 is terminated and may be switched to the home screen S1.

In the same way, a function execution screen for the entertainment function may be displayed or terminated when a drag touch for the second manipulator 200b is input, a function execution screen for the telephone function may be displayed or terminated when a drag touch for the third manipulator 200c is input, and a function execution screen for the environment setting function may be displayed or terminated when a drag touch for the fourth manipulator 200d is input.

When a function execution command for another function is input while a function execution screen for a specific function is provided to the display 260, the display 260 may terminate the function execution screen for the already provided function and may provide the function execution screen for the other function, and in an exemplary embodiment of the present invention, the newly provided function execution screen may be provided together with the already provided function execution screen.

The controller 250 may control the display 260 to display a preview screen for the function mapped to the first manipulator 200a when a first touch is input through the first manipulator 200a, and may control the display 260 to display a preview screen for the function mapped to the second manipulator 200b when the first touch of the user is input through the second manipulator 200b.

The first touch may include a long touch maintained for a predetermined time period or more. The present invention may prevent a malfunction of the vehicle due to an unintended touch by providing a preview screen when a long touch is input through the vehicle manipulator 200.

Manipulation methods of the first to fourth manipulators 200a, 200b, 200c, and 200d are the same as or substantially the same as the manipulation method of the vehicle manipulator 200, and an exemplary embodiment of the manipulation methods of the first and second manipulators 200a and 200b will be exemplarily described for convenience of description.

When the first touch is input to the second manipulator 200b while the display 260 displays the function mapped to the first manipulator 200a, the preview screen for the function mapped to the first manipulator 200a provided to the display 260 may be switched to the preview screen for the function mapped to the second manipulator 200b to be displayed.

Figure 13:
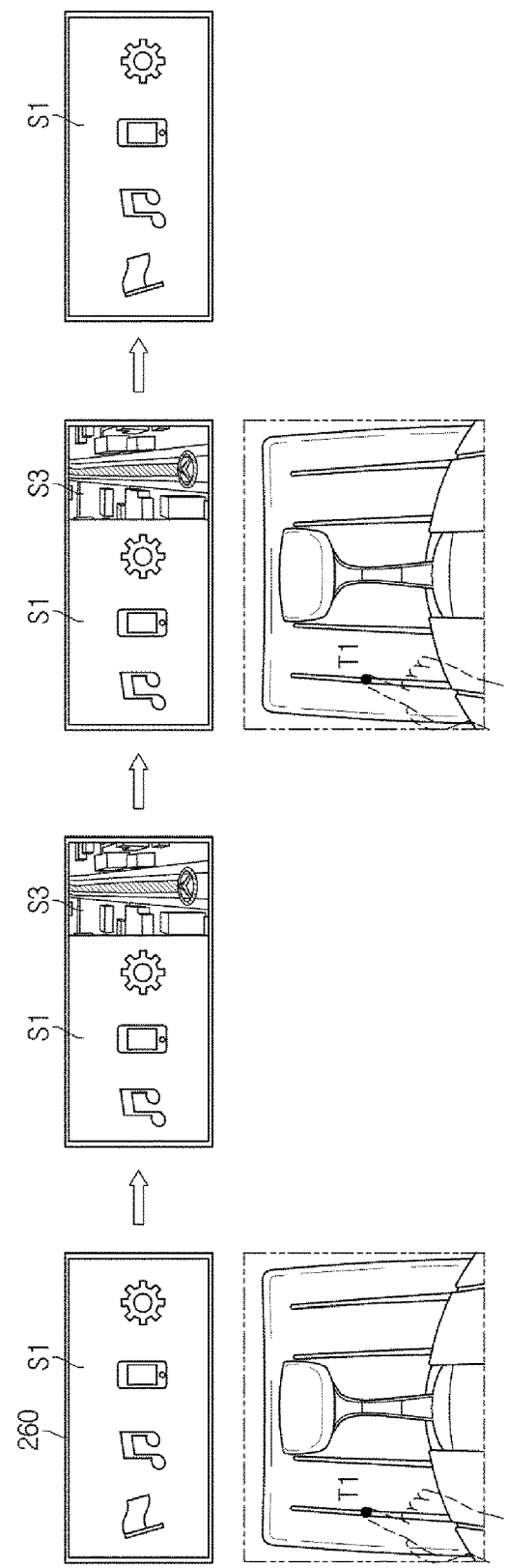
FIGS. 13 and 14 are views illustrating examples of screens displayed on a display according to a first touch input for the vehicle manipulator.
Figure 14:
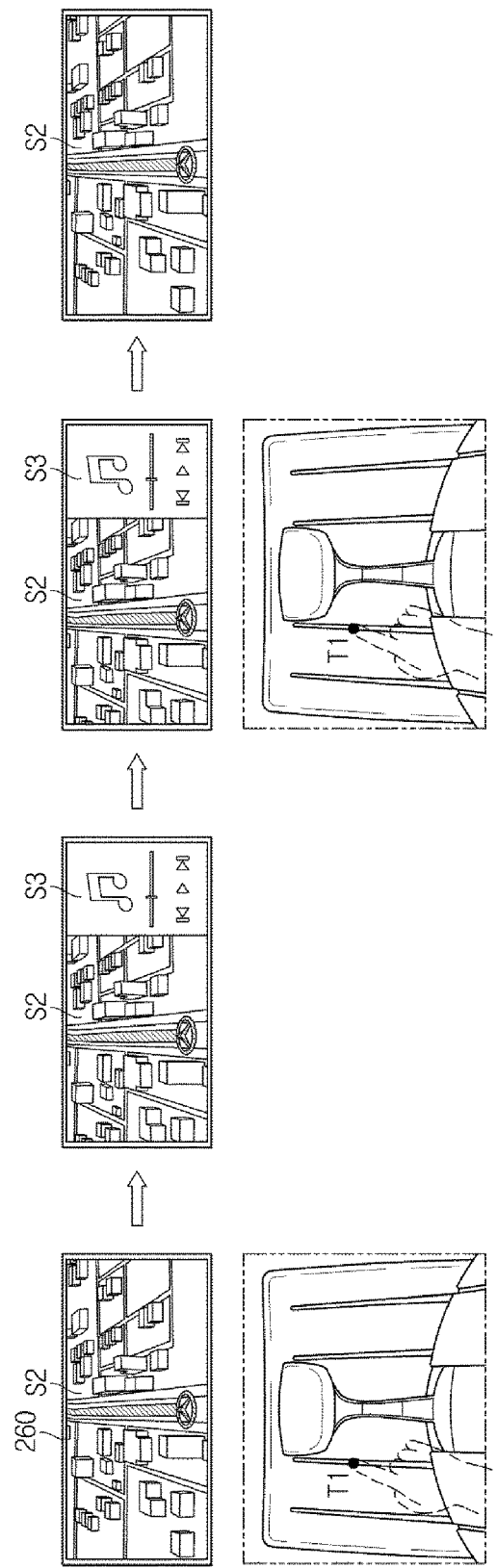

FIGS. 13 and 14 are views illustrating examples of screens displayed on the display 260 according to a first touch input for the vehicle manipulator 200.

Referring to FIG. 13, when a first touch Ti is input to the first manipulator 200a while the home screen S1 is provided to the display 260, a preview screen S3 for the navigation function is provided to an area of the home screen S1 which is provided to the display 260.

Subsequently, when the first touch is input to the first manipulator 200a, the preview screen S3 for the navigation function provided to the display 260 is terminated.

Although not illustrated in FIG. 13, when the first touch is input to one of the second to fourth manipulators 200b, 200c, and 200d while the preview screen for the navigation function is provided to the display 260, the preview screen for the navigation function provided to the display 260 may be switched to the preview screen for the function mapped to the corresponding manipulator.

Referring to FIG. 14, when the first touch T1 is input to the second manipulator 200b while the function execution screen S2 for the navigation function is provided to the display 260, the preview screen S3 for the entertainment function is provided to an area of the function execution screen S2 for the navigation function provided to the display 260.

Subsequently, when the first touch T1 is input to the second manipulator 200b, the preview screen S2 for the entertainment function provided to the display 260 is terminated.

Although not illustrated in FIG. 14, when the first touch T1 is input to one of the third and fourth manipulators 200c and 200d while the preview screen for the entertainment function is provided to the display 260, the preview screen for the entertainment function provided to the display 260 may be switched to the preview screen for the function mapped to the corresponding manipulator.

Furthermore, when the first touch T1 is input to the first manipulator 200a while the function execution screen S2 for the navigation function is provided to the display 260, instead of the preview screen S3 for the navigation function, detailed menus for the navigation function may be provided to an area of the function execution screen S2 for the navigation function provided to the display 260.

When a predetermined second touch T2 is input to the vehicle manipulator 200 while a function execution screen is provided to the display 260, the controller 250 may display a home menu screen including a plurality of buttons in an area of the display screen. Here, the vehicle manipulator 200 may be one of the first to fourth manipulators 200a, 200b, 200c, and 200d described above, and in an exemplary embodiment of the present invention, may be provided separately from the first to fourth manipulators 200a, 200b, 200c, and 200d.

The second touch T2 may include a long touch maintained for a predetermined time period or more. The present invention may prevent a malfunction of the vehicle due to an unintended touch by providing a preview screen when a long touch is input through the vehicle manipulator 200. Meanwhile, the second touch T2 may include other touches than a long touch to distinguish the second touch T2 from the above-described first touch T1, for example, a single tap, a double touch, and a multi-touch.

The controller 250 may provide a home menu screen in which the plurality of buttons is disposed on the basis of an alignment direction of the metal bar 212 of the vehicle manipulator 200. As an example, when the vehicle manipulator 200 is disposed in the front and rear direction of the vehicle, the controller 250 may provide a home menu screen provided in which the plurality of buttons are disposed longitudinally in the area of the display screen, and when the vehicle manipulator 200 is disposed in the lateral direction of the vehicle, the controller 250 may provide a home menu screen provided in which the plurality of buttons are disposed transversely in the area of the display screen.

The plurality of buttons are disposed in the area of the display screen in order of functions of recently used buttons except a button to which a function provided to the display 260 is mapped. In an exemplary embodiment of the present invention, functions that have not been used in a predetermined time period may be disposed in the area of the display screen according to a configuration order of the menu.

When a drag touch is input along the metal bar 212 of the vehicle manipulator 200, the controller 250 may provide a button icon selected by the drag touch from among the plurality of buttons provided on the home menu screen by changing a state of the button icon.

As an example, in the case in which the metal bar 212 of the vehicle manipulator 200 is laterally disposed, when a drag touch is input in the rightward direction along the metal bar 212, the controller 250 may enlarge or emphasize button icons sequentially selected among the plurality of buttons provided on the home menu screen in a direction from a left side to a right side thereof according to the drag touch, or may change colors of the button icons.

When a final button on the home menu screen is selected by inputting a drag touch to the vehicle manipulator 200, the controller 250 may control operation of the display 260 such that the remaining buttons on the home menu screen disappear toward a side opposite to the final button and new buttons are provided. For example, when the final button on the home menu screen is selected by inputting a drag touch to the vehicle manipulator 200 from the left side to the right side, the controller 250 may control operation of the display 260 such that the remaining buttons on the home menu screen disappear toward the side opposite to the final button, that is, from the left side to the right side, and new buttons are continuously provided on the right side thereof.

Subsequently, when a touch is input to the vehicle manipulator 200, the controller 250 may control the display 260 such that the display 260 provides a function execution screen for a corresponding function.

Figure 15:
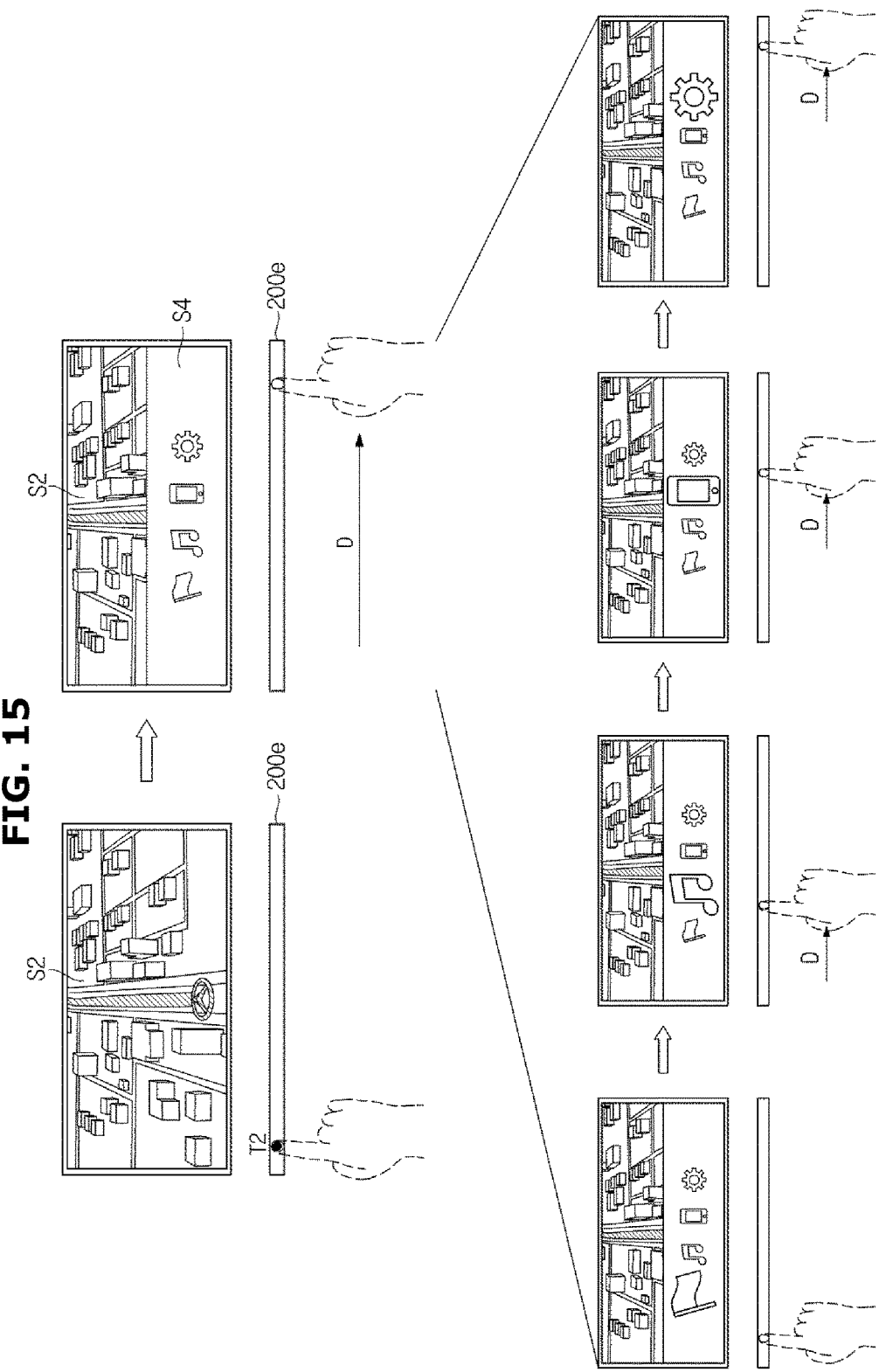
FIG. 15 is a view illustrating an example of providing a home menu screen displayed on the display according to a touch input for the vehicle manipulator.

FIG. 15 is a view illustrating an example of a home menu screen displayed on the display 260 according to a touch input for the vehicle manipulator 200. Hereinafter, an example in which a symbol of the vehicle manipulator disposed in the center fascia 130 is assigned to 200e will be referred to as an exemplary embodiment of the case in which the vehicle manipulator 200 is laterally provided in the center fascia 130 separately from the first to fourth manipulators 200a, 200b, 200c, and 200d.

Referring to FIG. 15, when the second touch T2 is input to the vehicle manipulator 200e while the function execution screen S2 for a specific function is input to the display 260, a home menu screen S4 in which a plurality of buttons are transversely disposed side by side may be provided at an upper end portion or a lower end portion of the function execution screen S2.

When a drag touch D is input from the left side to the right side along the metal bar 212 of the vehicle manipulator 200, the controller 250 may provide a button icon selected by the drag touch D from among the plurality of buttons provided on the home menu screen S4 by changing a state of the button icon, and then may provide the function execution screen S2 for a function mapped to the corresponding button icon when a touch is input to the vehicle manipulator 200.

The configuration and operation principle of the vehicle 100 according to the embodiment have been described above. Meanwhile, the vehicle manipulator 200 according to an exemplary embodiment of the present invention may be applied to several parts in the vehicle, in addition to the above-described locations. More specifically, the metal bar 212 may be disposed around the seat 110 to adjust a passenger seat, adjust a back seat, adjust reclining of the rear seat, adjust a leg support of the rear seat, adjust a front and rear location or angle of the passenger seat, and adjust reclining of the rear seat after adjusting the passenger seat.

Next, a process of controlling a vehicle according to an exemplary embodiment will be described.

Figure 16:
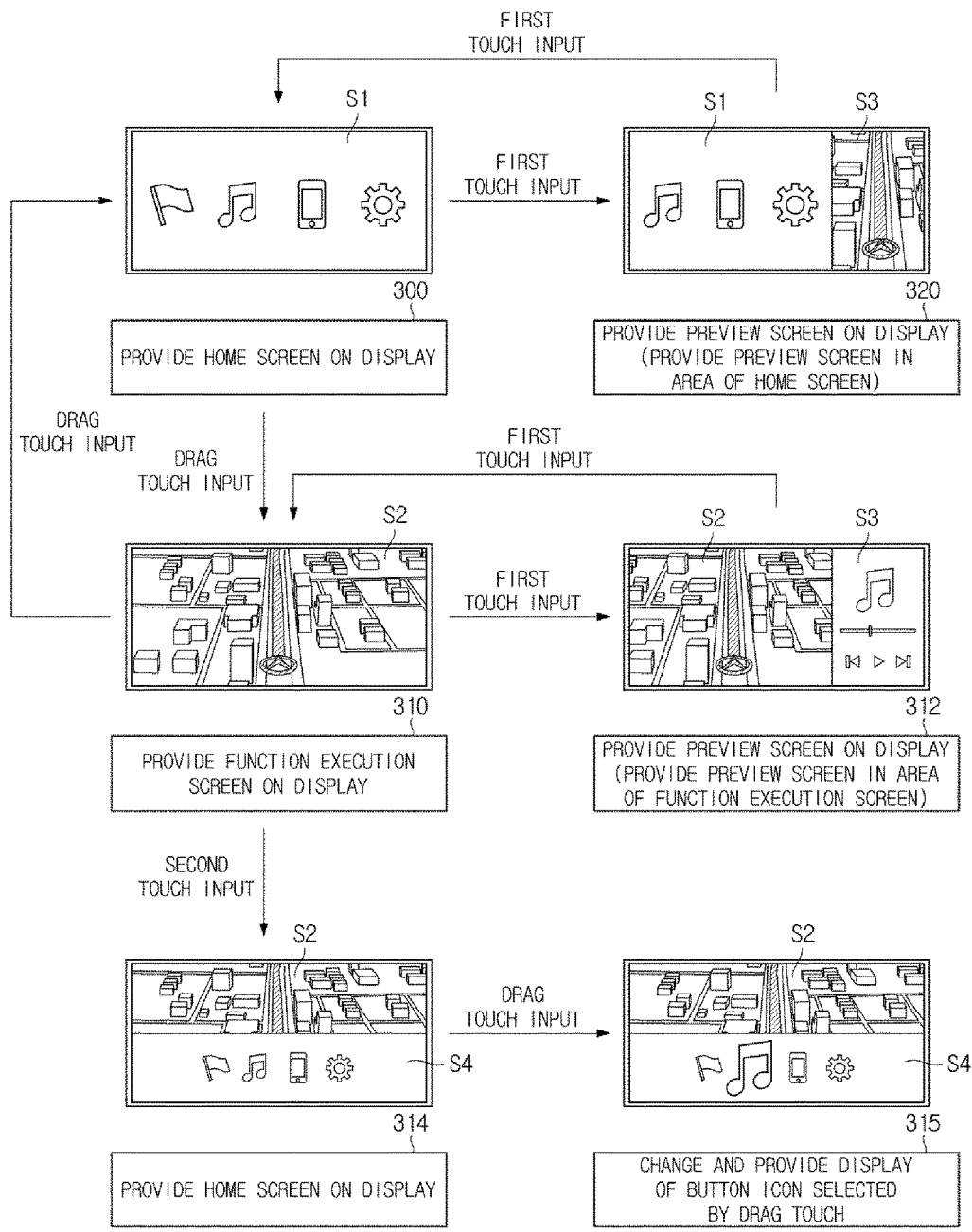
FIG. 16 is a conceptual view illustrating a process of controlling a vehicle according to an exemplary embodiment.

FIG. 16 is a conceptual view of switching a display screen according to a process of controlling a vehicle according to an exemplary embodiment. Hereinafter, referring to FIG. 16, the method of switching a display screen, which starts from a time point at which the home screen S1 is provided by the display 260 according to a manipulation of the vehicle manipulator 200 (300), will be described.

First, when the drag touch D in the first direction is input through the vehicle manipulator 200 while the home screen S1 is provided to the display 260, the function execution screen S2 is provided to the display 260 (310). In more detail, when the drag touch in the first direction is input to the vehicle manipulator 200, a control signal for controlling an operation of the display 260 is generated based on an output signal of the vehicle manipulator 200, and the display 260 may display the function execution screen S2 for the function mapped to the vehicle manipulator 200. For example, when a slide up drag touch is input to the first manipulator 200a, the display 260 may display the function execution screen S2 for the navigation function mapped to the first manipulator 200a.

When a drag touch in the second direction opposite to the first direction is input to the vehicle manipulator 200 while the function execution screen (S2) is provided to the display 260, the display 260 terminates the function execution screen S2 for the function mapped to the vehicle manipulator 200. For example, when a slide up drag touch is input to the first manipulator 200a, the display 260 may display the function execution screen S2 for the navigation function mapped to the first manipulator 200a. When the function execution screen S2 is terminated, the display 260 may provide the home screen S1 again.

Next, when the first touch T1 is input to the vehicle manipulator 200 while the function execution screen S2 is provided to the display 260, a control signal for controlling an operation of the display 260 is generated based on the output signal of the vehicle manipulator 200 and a preview screen is provided to an area of the function execution screen S2 (310 and 312).

When the function execution screen S2 and the preview screen S3 are provided together, the function execution screen S2 may be reduced or only some areas thereof may be provided to the display 260. For example, the first touch T1 is input to the second manipulator 200b, the display 260 provides a partial area of the function execution screen S2 based on an output signal of the second manipulator 200b, and the preview screen S3 for the entertainment function mapped to the second manipulator 200b may be provided to the provided area of the function execution screen S2.

When the first touch T1 is reinput to the vehicle manipulator 200 while the preview screen S3 is provided to an area of the display screen, the preview screen S3 provided to the area of the display screen is terminated. When the preview screen S3 is terminated, the function execution screen S2 is provided over the entire screen of the display 260 (310). For example, when the first touch Ti is reinput to the second manipulator 200b while the preview screen S3 is provided to the area of the display screen, the preview screen S3 provided to the area of the display screen is terminated.

In an exemplary embodiment of the present invention, it is apparent that, when the first touch T1 is input to the third or fourth manipulator 200c or 200d while the preview screen S3 is provided to an area of the display screen, the preview screen S3 provided to the area of the display screen may be switched to the preview screen for the function mapped to the third or fourth manipulator 200c or 200d.

Next, when the second touch T2 is input to the vehicle manipulator 200 while the function execution screen S2 is provided to the display 260, a control signal for controlling an operation of the display 260 is generated based on an output signal of the vehicle manipulator 200 and the home menu screen S4 is provided to an area of the function execution screen S2 (310 and 314).

For example, when the second touch T2 is input to the vehicle manipulator 200e transversely disposed in the center fascia while the function execution screen is provided to the display 260, the home menu screen S4 is provided to a lower end portion area of the display 260 based on an output signal of the vehicle manipulator 200e.

When a drag touch is input to the vehicle manipulator 200e in a state in which the home menu screen S4 is provided to an area of the display screen, the display 260 provides a button icon selected by the drag touch by changing the state of the button icon (314 and 315).

For example, when a drag touch is input to the vehicle manipulator 200e transversely disposed in the center fascia 130 while the home menu screen S4 is provided to the lower end portion area of the display screen, the display 260 changes a state of a button icon selected by the drag touch.

Next, when the first touch T1 is input to the vehicle manipulator 200 while the home screen S1 is provided to the display 260, the preview screen S3 for the function mapped to the vehicle manipulator 200 is provided to an area of the display screen (300 and 320).

For example, when the first touch T1 is input to the first manipulator 200a while the home screen S1 is provided to the display 260, the preview screen S3 for the function mapped to the first manipulator 200a is provided to the area of the display screen.

When the first touch T1 is input to the vehicle manipulator 200 in a state in which the preview screen S3 is provided to an area of the display screen, the preview screen S3 provided to the area of the display screen is terminated or the provided preview screen S3 is switched to the preview screen S3 for the function mapped to the corresponding vehicle manipulator 200 (320 and 300).

For example, when the first touch T1 is input to the first manipulator 200a, the preview screen S3 for the navigation function provided to the display 260 is terminated.

In an exemplary embodiment of the present invention, when the first touch T1 is input to the second manipulator 200b, the preview screen S3 for the navigation function provided to an area of the display screen is switched to the preview screen S3 for the entertainment function mapped to the second manipulator 200b.

As is apparent from the above description, in a vehicle and a control method of the same in accordance with one aspect of the present invention, a user can input control commands for various convenient devices provided in the vehicle by easily manipulating a manipulator even when driving the vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents

What is claimed is:

1. A vehicle comprising:
   a manipulator including a metal bar extending in a first direction thereof and formed of a metal material, and a plurality of detectors disposed adjacent to the metal bar in the first direction;
   a display configured to display a manipulation result of the manipulator; and
   a controller configured to generate a control signal for controlling an operation of the display based on an output signal of the manipulator,
   wherein, when a drag touch is input to the manipulator in the first direction, a function execution screen is displayed for a function mapped to the manipulator,
   wherein the manipulator includes plurality of manipulators including a first manipulator and a second manipulator, and wherein the display displays a preview screen for a function mapped to the first manipulator when a touch is input to the first manipulator, and displays a preview screen for a function mapped to the second manipulator when the touch is input to second manipulator.

2. The vehicle of claim 1, wherein, when the drag touch is input to the manipulator in a second direction opposite to the first direction, the display terminates the function execution screen for the function mapped to the manipulator.

3. The vehicle of claim 1, wherein different functions are mapped to the first and second manipulators.

4. The vehicle of claim 1, wherein
the display displays a result screen for a function mapped to the first manipulator when the drag touch is input to the first manipulator; and
the display displays a result screen for a function mapped to the second manipulator when the drag touch is input to the second manipulator.

5. The vehicle of claim 1, wherein the preview screen is provided in a predetermined area of the display screen.

6. The vehicle of claim 1, wherein, when a predetermined touch is input to the second manipulator while the display displays the preview screen for the function mapped to the first manipulator, the display switches the preview screen fur the function mapped to the first manipulator to the preview screen for the function mapped to the second manipulator.

7. A vehicle comprising: a manipulator including a metal bar extending in a first direction thereof and formed of a metal material, and a plurality of detectors disposed adjacent to the metal bar in the first direction: a display configured to display a manipulation result of the manipulator; and a controller configured to generate a control signal for controlling an operation of the display based on an output signal of the manipulator, wherein, when a drag tough is input to the manipulator in the first direction, a function execution screen is displayed for a function mapped to the manipulator, wherein, when a touch is input to the manipulator while the function execution screen is provided to the display, the display displays a home menu screen including a plurality of buttons in a predetermined area of the display screen.

8. The vehicle of claim 7, wherein the display displays the home menu screen in which the plurality of buttons are disposed on a basis of the first direction of the metal bar.

9. The vehicle of claim 7, wherein, when a drag touch is input to the manipulator along the metal bar, the display provides a button icon selected by the drag touch from the plurality of buttons provided on the home menu screen by changing a state of the button icon.

10. A vehicle comprising;
a manipulator including a metal bar extending in a first direction thereof and formed of a metal material, and a plurality of detectors disposed adjacent to the metal bar in the first direction;
a display configured to display a manipulation result of the manipulator, and
a controller configured to generate a control signal for controlling an operation of the display based on an output signal of the manipulator,
wherein the manipulator includes:
a first detector device including the metal bar and a first detector connected to the metal bar and configured to collect touch information related to a user regarding the metal bar; and
a second detector device including a plurality of second detectors disposed adjacent to a first side of the metal bar in the first direction and configured to collect touch or proximity information related to the user regarding the plurality of second detectors,
wherein, when detector value information related to the first detector device is collected, the controller is configured to recognize a touch of the user based on detector value information collected by the second detector device with the detector value information related to the first sensor device.

11. The vehicle of claim 10, wherein the manipulator further includes a third detector device including a plurality of third detectors disposed adjacent to a second side of the metal bar in the first direction and configured to collect touch or proximity information related to the user regarding the plurality of third detectors,
wherein, when the detector value information related to the first detector device is received, the controller is configured to recognize the touch of the user based on detector value information collected by at least one of the second detector device and the third detector device with the detector value information related to the first sensor device.

12. A method for controlling a vehicle including a manipulator having a metal bar extending in a first direction thereof and formed of a metal material and a plurality of detectors disposed adjacent to the metal bar in the first direction, and a display configured to display a manipulation result of the manipulator, the method including:
inputting a drag touch to the manipulator in the first direction;
generating a control signal for controlling an operation of the display based on an output signal of the manipulator; and
displaying, by the display, a function execution screen for a function mapped to the manipulator,
wherein the manipulator includes a plurality of manipulators including a first manipulator and a second manipulator; and
displaying, by the display, a preview screen for a function mapped to the first manipulator when a touch is input to the first manipulator, and displaying, by the display, a preview screen for a function mapped to the second manipulator when the touch is input to the second manipulator.

13. The method of claim 12, further including terminating, by the display, the function execution screen for the function mapped to the manipulator when the drag touch is input to the manipulator in a second direction opposite to the first direction.

14. The method of claim 12, further including displaying, by the display, the preview screen for the function mapped to the manipulator in a predetermined area of the display screen when the touch is input to the manipulator.

15. A method for controlling a vehicle in a manipulator having a metal bar extending in a first direction thereof and formed of a metal material and a plurality of detectors disposed adjacent to the metal bar in the first direction, and a display configured to display a manipulation result of the manipulator ,the method including:
inputting a drag touch to the manipulator in the first direction:
generating a control signal for controlling an operation of the display based on an output signal of the manipulator;
displaying, by the display, a function execution screen for a function mapped to the manipulator; and
displaying, by the display, a home menu screen including a plurality of buttons in a predetermined area of the display screen when a touch is input to the manipulator while the function execution screen is provided to the display.

16. The method of claim 15, wherein the displaying of the home menu screen includes:
   displaying a home menu screen in which the plurality of buttons are disposed on a basis of an alignment direction of the metal bar; and
   providing a button icon selected by the drag touch from among the plurality of buttons displayed on the home menu screen by changing a state of the button icon when the drag touch is input to the manipulator in the first direction.

17. A method for controlling a vehicle including a manipulator having a metal bar extending in a first direction thereof and formed of a metal material and a plurality of detectors disposed adjacent to the metal bar in the first direction, and a display configure to display a manipulation result of the manipulator, the method including:
   inputting a drag touch to the manipulator in the first direction;
   generating, a control signal for controlling an operation of the display based on an output signal of the manipulator: and
   displaying, by the display, a function execution screen for a function mapped to the manipulator,
   wherein the manipulator includes:
   a first detector device including the metal bar and a first detector connected to the metal bar to collect touch information related to a user regarding the metal bar;
   a second detector device including a plurality of second detectors disposed adjacent to a first side of the metal bar in the first direction and configured to collect touch or proximity information related to the user regarding the plurality of second detectors; and
   a third detector device including a plurality of third detectors disposed adjacent to a second side of the metal bar in the first direction and configured to collect touch or proximity information related to the user regarding the plurality of third detectors,
   wherein, when detector value information related to the first detector device is received, a touch of the user is recognized based on detector value information collected by at least one of the second detector device and the third detector device with the detector value information related to the first sensor device.

* * * * *